United States Patent [19]

Schoenhard

[11] Patent Number: 4,765,835

[45] Date of Patent: Aug. 23, 1988

[54] FILTER PROCESS FOR SILVER RECOVERY FROM POLYMERIC FILMS

[75] Inventor: James D. Schoenhard, Morrison, Ill.

[73] Assignee: City of Canton, IL, Canton, Ill.

[21] Appl. No.: 889,637

[22] Filed: Jul. 28, 1986

Related U.S. Application Data

[63] Continuation-in-part of Ser. No. 802,791, Nov. 27, 1985, Pat. No. 4,629,780, which is a continuation-in-part of Ser. No. 776,256, Sep. 16, 1985, abandoned.

[51] Int. Cl.$^4$ .............................................. C22B 11/04
[52] U.S. Cl. .................................. 75/118 P; 528/488
[58] Field of Search ........................................ 75/118 P

[56] References Cited

U.S. PATENT DOCUMENTS

| | | | |
|---|---|---|---|
| 3,647,422 | 3/1972 | Wainer | 75/118 P |
| 4,392,889 | 7/1983 | Grout | 75/118 P |
| 4,585,561 | 4/1986 | Zlokarnik | 75/118 P |
| 4,612,057 | 9/1986 | Buser | 75/118 P |

*Primary Examiner*—Paul R. Michl
*Assistant Examiner*—Mark R. Buscher
*Attorney, Agent, or Firm*—John R. Crossan

[57] ABSTRACT

Silver is removed from polymeric film chips such as photographic and X-ray film in a caustic treatment bath which dissolves or separates the saran and gelatin layer from the polymer, particularly polyester, layer. The silver is captured for recovery in a diatomaceous filter medium through which the treatment bath liquid is passed. Preferably liquid passed to the filter is silver-rich liquid skimmed from the top of the treatment bath. Chips and other debris are seived or screened from the liquid before filtering.

3 Claims, No Drawings

FILTER PROCESS FOR SILVER RECOVERY FROM POLYMERIC FILMS

The present application is a continuation-in-part of my prior copending U.S. patent application Ser. No. 802,791, filed Nov. 27, 1985, now U.S. Pat. No. 4,629,780, and containing allowable claims, which in turn was a continuation-in-part of my prior U.S. application Ser. No. 776,256, filed Sept. 16, 1985, and now abandoned in favor of the allowable application.

The present invention relates to separation and recovery of precious metals, and particularly to filtration methods of silver separation from photographic film.

Silver is a precious metal which is also used commercially to produce dark tones on photographic film. Such film generally consists of three main layers: a polyester base or sheet for toughness and strength, an intermediate layer of saran or polyvinylidene chloride; and an upper layer of gelatin containing a silver halide. Silver has previously been recovered from photographic film by reacting the silver halide with a cyanide-containing solution. Other silver recovery methods have used solvents such as tetrahydrofuran. These and other known methods of silver recovery typically do not recover about 20% of the silver on the film chip, leaving it in the gelatin layer or in the waste liquids resulting from the silver separation process. 80,000 lbs. of film chips typically bear about 800 lbs. of silver, 160 lbs. of which is not recovered by previous processes. That loss is significant, but previous attempts to economically recover more of the silver have failed.

It has now been found that the processes disclosed and claimed in my prior applications, Ser. Nos. 776,256 and 802,791, when carried out with photographic film chips, separate 100% of the silver from the base polymer layer of the film chips by removing both the gelatin layer and the intermediate saran or polyvinylidene chloride layer. In accordance with the principles of the present invention, the treatment bath liquid, which was disclosed in my prior related applications, can be filtered using a fine diatomaceous earth or silica filter to remove the silver from the treatment bath and capture it in a filter cake. Silver loss from such filtering is only half as great as that of prior processes. The silver captured is then separated from the filter cake by any suitable known metal recovery process.

My parent applications disclose preferred embodiments for a process for recovering a polymer layer such as polyester or polyvinyl chloride from a multi-layer scrap or waste material in a rapid, efficient, safe, and relatively low-cost method. The recovered polymer is in a form suitable for reprocessing into polyester thread and other plastic materials. The disclosures of my prior U.S. patent applications Ser. Nos. 776,256 and 802,791 are incorporated by reference herein. However, in brief, the polymer is recovered by contacting chips of the multi-layered material with an aqueous solution containing a base metal hydroxide and a reagent selected from the group consisting of a salt, an amine, and an oxidizing agent. The salt is a base metal chloride, for example sodium or potassium. An oxidizing agent can be sodium hypochlorite, ozone, or hydrogen peroxide. An amine would consist of monoethamolamine and morpholine.

The recovery process can be accelerated by the addition of heat, agitation, and/or alkyl dimethyl benzyl ammonium chloride. The aqueous solution is allowed to contact a multi-layered chip material until the polymer layer and other layers are separated. The polymer layer is recovered from the aqueous solution for reuse. The saran or polyvinylidine, the gelatin, and the silver halide are dissolved or left as colloids in the treatment bath.

The polymer and silver recovery processes are advantageously carried out using an open vat and associated treatment processes similar to those disclosed in my U.S. Pat. No. 4,590,261, issued May 20, 1986, showing a method and apparatus for detoxification of cyanide contaminated polymeric film chips. That disclosure also is incorporated herein by reference. Other devices including closed vats, drums, tanks, and continuous conveyors, and the like could be used to provide necessary treatment and agitation to the chips.

In a preferred embodiment of any polymer recovery process, the saturated base metal hydroxide solution, the alkyl dimethyl benzyl ammonium chloride, the sodium hypochlorite, and the base metal chloride are prepared as an aqueous solution. The temperature of the aqueous solution is then raised to at least about 50° Centigrade, preferably between 60° and 65° Centigrade, and up to about 80° Centigrade. The multilayered chip material is then brought into contact with the heated aqueous solution. The chips are allowed to remain in contact with the aqueous solution for at least one and one-half hours at which time the polyvinylidene chloride (saran) will have gone into solution. The polyester layer material can then be recovered by isolating the layer of material from the aqueous solution. This process can be repeated on successive batches by reconstituting and reusing the original aqueous solution.

An example following the above method, using X-ray film, is as follows. A solution having the following constituents was prepared at room temperature.
One liter Water
0.2 liter potassium hydroxide (saturated)
181.4 grams potassium chloride
The resulting aqueous solution was heated to 80° Centigrade and one half liter of loose chip material was thereafter added to the heated aqueous solution. The temperature was maintained at 80° Centigrade for one hour after which the solution was agitated and the polyester layer removed.

In accordance with the present invention, liquid from the polymer recovery bath is preferably skimmed from the surface by any type of overflow system, such as skimming pipes along the walls of the vat. The liquid is passed through a screen, having about one-eighth inch openings, to sort out chips, debris, and any clumps of material. The liquid then is pumped to one or more high volume filters.

A preferred form of filter is a rotating leaf filter with a centrifugal cake discharge, such as is shown in a January 1985 brochure of the Manville Co., of Denver, Colo. entitled "Celite ® Filter Aids", page 16. Such filter comprises a plurality of horizontal circular disks mounted on a rotatable central column. The disks are hollow and are communicated through a radially inward connection to an interior passage of the column, which forms an outlet for filtered liquid. Celite ® filter aid or other diatomaceous earth or similar medium is used as a precoat on the filter disks, preferably in a range of about eight to ten microns of pore size. Smaller silver particles on higher speed films require a finer filter aid or medium to trap them. All metal parts are stainless steel, to resist corrosion by the caustic liquid.

One preferred embodiment for practicing the invention uses a pump of 400 to 1,000 gallon per minute flow capacity for a treatment bath volume of about 25,000 gallons. This pump capacity allows the full treatment bath volume to be filtered in a chip treatment time of even one hour or less, excluding mixing or dilution effects. The pump feeds into either of a pair of filter units, which are connected in parallel. Each filter unit has twelve disks, each 36 inches in diameter, and a four inch center column. The outside diameter of the filter unit is about 42 inches, and the filter unit is about seven feet high (plus its supports). In practice, the pump feeds treatment bath liquid to one or the other of the filter units, while the filter cake with recovered silver is being removed from the other filter by rotating and bumping the filter disks. Additional filter units can be added and used in parallel for greater capacity. Each filter unit is used until the pressure across the filter builds up to an acceptable limit, at which time it is shut down for cake removal and the flow is transferred to a different unit. The filtrate is preferably returned to a liquid heating tank which is separate from the treatment bath containing the chips.

Any form of skimming, pumping, and filtering device can be employed to handle the treatment bath liquid for silver recovery, within the scope of the present invention, so long as the filter employed has appropriate pore sizes to capture the silver and avoid its being passed through the filter for return to the treatment tank. Rotating leaf horizontal filters are favored at the present time but other forms of filter, as shown in the Manville brochure or otherwise known to the art, now or hereafter, can as well be employed.

The appended claims, together with all equivalents thereof, define the scope of the invention.

I claim as my invention:

1. A method of recovering silver from photographic film chips, comprising the steps:

dissolving or separating the gelatin layers and silver therein from the film chips in a caustic liquid treatment bath which is comprised of an aqueous solution containing a base metal hydroxide and a reagent selected from the group consisting of a salt, an amine, and an oxidizing agent;

passing liquid and the dissolved or separated silver therein from the treatment bath to a filter including a filter medium having pores in an effective range for silver halides; and collecting the silver contained in the liquid in or on the filter medium.

2. A method of recovering silver as defined in claim 1, wherein the treatement liquid is heated to a temperature of at least 50° Centigrade.

3. A method of recovering silver from photographic film chips, the method comprising the steps:

dissolving or separating saran and gelatin layers and silver therein from the film chips in a caustic liquid treatment bath which is comprised of an aqueous solution containing a base metal hydroxide and a reagent selected from the group consisting of a salt, an amine, and an oxidizing agent;

passing liquid and the dissolved or separated silver therein from an upper portion of the treatment bath to a filter, the filter including a filter medium having pores in an effective range for silver halides, and wherein all of the treatment bath is filtered at a rate of at least approximately once per hour; and collecting the silver contained in the liquid in or on the filter medium.

* * * * *